Patented Aug. 30, 1932

1,874,307

UNITED STATES PATENT OFFICE

ARCHIE R. KEMP, OF WESTWOOD, NEW JERSEY, ASSIGNOR TO BELL TELEPHONE LABORATORIES, INCORPORATED, OF NEW YORK, N. Y., A CORPORATION OF NEW YORK

INSULATING COMPOUND

No Drawing.   Application filed March 2, 1929.   Serial No. 344,099.

This invention relates to compositions of matter having properties such as to render them suitable for insulating submarine signaling conductors.

The characteristics necessary in compositions of matter useful for such purposes are well known. The principal electrical characteristics are a low dielectric constant and low dielectric losses, these properties being stable and reasonably permanent under sea bottom conditions. The physical properties comprise suitable cold flow characteristics, suitable degree of toughness, lack of brittleness, thermoplastic properties rendering the composition extrusible, and permanency of physical properties under storage and sea bottom conditions. For commercial utility reasonable cost is also a factor.

Certain rubber derivatives having various properties of gutta percha, balata, shellac, etc., to a greater or lesser extent are well known and are described, for example in U. S. patent to Fisher, No. 1,605,180, November 2, 1926. Compositions of matter including one or more of such rubber derivatives with or without crude rubber and with or without the addition of other substances such as waxes and gums have heretofore been proposed.

An object of the present invention is to provide improved compositions of matter having the properties necessary in a submarine cable insulating material to a higher degree than heretofore. A further object is to eliminate the necessity for using gutta percha, or alternatively to reduce the amount of gutta percha necessary in a submarine cable insulation because gutta percha is relatively expensive and the supply limited.

These and other objects are accomplished in accordance with a feature of the invention by producing a composition of matter including one or more of the rubber derivatives previously mentioned and gutta percha or balata.

A typical composition of matter in accordance with the invention comprises several principal constituents;

For the first constituent mix approximately six parts by weight of p-phenol sulfonic acid directly into 100 parts of undissolved rubber while being worked on a rubber mill or otherwise, and when thoroughly mixed the material is removed from the mill and heated in a compact mass in an oven for four to ten hours at 120° to 145° C. In about two to eight hours after starting the heating, depending upon how rapidly the batch heats up, a pronounced exothermal reaction sets in, the temperature of the material rising to 200°–230° C. and quantities of vapors and gases are given off. The heating should be continued for about two hours beyond the peak of the exothermal temperature rise. The product is a tough material somewhat similar to balata.

To make the second constituent, masticate 100 parts rubber on a mill and gradually add thereto during the working a mixture of 8 parts of p-toluene sulfonic acid, two parts concentrated sulphuric acid (sp. gr. 1.84) and two parts water. When the reagent has been thoroughly dispersed in the rubber, the latter is removed and heated in a thick mass in an oven for 8 hours at an oven temperature of 140° C. An exothermal reaction sets in, somewhat more energetic than in the first constituent, and the temperature rises to 250° or higher. The weight loss represented in vapors and gases driven off during the reaction is approximately 6 to 7%. The source of heat is then cut off and the mixture permitted to cool in the oven.

A third principal constituent is rubber which may be in the form of pale crepe or smoked sheet.

A fourth principal constituent may be either balata or gutta percha or both.

Various minor constituents may be present, for example, an antioxidant such as a combination of acetaldol $CH_3.CHOH.CH_2.CHO$ with alpha-naphthylamine $C_{10}H_7.NH_2$ in equi-molecular proportions although, in general, the antioxidant is unnecessary. However, other minor constituents may, within the scope of the invention, be present.

A composition of matter comprising 42.5 parts of the first constituent described above, 32.5 parts of the second constituent, and 25 parts of the third constituent with three parts of an antioxidant such as described, when manufactured by breaking down the second constituent on a mill, milling it into the first constituent, then milling in the third constituent and then adding the antioxidant has been found to have electrical properties, and mechanical properties approximating to a degree, those required for submarine cable insulation. However, such a composition and other similar compositions composed of rubber derivatives given above have been found to have mechanical characteristics not strictly suitable for submarine cable insulation. For example, they become brittle and subject to deformation, etc., at ordinary temperatures.

However, by adding gutta percha in amounts up to about one-third of the total composition or more particularly and preferably by adding balata in amounts up to about one-third of the total composition, there are produced resultant compositions having greatly improved mechanical properties. Consequently a typical composition in accordance with the present invention would comprise 42.5 parts of the first constituent mentioned above, 32.5 parts of the second constituent, 25 parts of the third constituent and 20 parts of the fourth constituent which may by either balata or gutta percha or both.

Another composition in accordance with the invention comprises 30 parts of a material similar to the first constituent mentioned above in which 4½ parts of concentrated sulphuric acid are mixed directly into rubber and caused to react exothermically therewith, 30 parts of ordinary sheet rubber and 40 parts of deresinated balata.

In general, balata is preferred to gutta percha in compositions in accordance with this invention and either the balata or gutta percha may be deresinated before being milled into the mixture.

In compositions in accordance with the invention an effect of the other ingredients is to stabilize the gutta percha in respect to effects of low temperatures and high pressures upon its electrical characteristics, especially leakance.

For the purposes of this invention the expression "gutta percha" will be used in the appended claims as including both balata and gutta percha, balata being regarded as a species of gutta percha, but the term "balata" will be used in the specific sense of the commercial product ordinarily sold under that name.

The rubber derivatives which constitute an ingredient may consist of a single rubber derivative or a plurality of different rubber derivatives. In general, however, they comprise one or more positions produced by causing a sulfonic compound having the grouping $R-SO_2-X$, wherein R represents an organic radical or a hydroxy group and X represents a hydroxy group or chlorine, which is caused to react exothermically with rubber.

What is claimed is:

1. An insulating composition for cables having physical and electrical properties suitable for insulating long high grade deep sea signaling cables characterized in this that the composition includes, first, at least 20% of one or more rubber derivatives resulting from the exothermic reaction with rubber of a sulfonic compound having the grouping $R-SO_2-X$, wherein R represents an organic radical or hydroxy group and X represents a hydroxy group or chlorine, and, at least 10% of second, gutta percha.

2. A composition of matter in accordance with claim 1 including balata.

3. A composition of matter in accordance with claim 1 including ordinary rubber.

4. A composition of matter in accordance with claim 1 including deresinated gutta percha.

5. A composition of matter in accordance with claim 1 including deresinated balata and ordinary rubber.

6. A composition of matter in accordance with claim 1 in which the gutta percha content is about 10% to 50%.

7. A composition of matter comprising at least 20% of a derivative of rubber produced by reacting on the rubber with material including an organic radical and a sulpho-group ($-SO_2.OH$), and at least 10% of gutta percha.

In witness whereof, I hereunto subscribe my name this 1st day of March, 1929.

ARCHIE R. KEMP.